(12) United States Patent
Ko et al.

(10) Patent No.: US 11,550,122 B2
(45) Date of Patent: Jan. 10, 2023

(54) OPTICAL LENS AND ELECTRONIC DEVICE HAVING OPTICAL LENS

(71) Applicant: HON HAI PRECISION INDUSTRY CO., LTD., New Taipei (TW)

(72) Inventors: Chun-Cheng Ko, New Taipei (TW); Yi-Ting Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 303 days.

(21) Appl. No.: 17/094,753

(22) Filed: Nov. 10, 2020

(65) Prior Publication Data

US 2022/0019054 A1   Jan. 20, 2022

(30) Foreign Application Priority Data

Jul. 16, 2020   (CN) .......................... 202010688440.6

(51) Int. Cl.
*G02B 9/64* (2006.01)
*G02B 9/34* (2006.01)
*H04N 5/225* (2006.01)
*G02B 13/00* (2006.01)

(52) U.S. Cl.
CPC ............. *G02B 9/34* (2013.01); *G02B 13/004* (2013.01); *H04N 5/2254* (2013.01)

(58) Field of Classification Search
CPC .............................. G02B 9/64; G02B 13/0045
See application file for complete search history.

(56) References Cited

U.S. PATENT DOCUMENTS 9,316,808 B1 * 4/2016 Hudyma .............. H04N 5/2253

* cited by examiner

*Primary Examiner* — Joseph P Martinez
(74) *Attorney, Agent, or Firm* — ScienBiziP, P.C.

(57) ABSTRACT

An optical lens includes seven lenses sequentially arranged along an optical axis from an object side to an image side. A fourth lens includes a seventh surface facing the object side and an eighth surface facing the image side. Each of the seventh surface and the eighth surface includes an inflection point. The optical lens satisfies the following conditional formulas:

| | |
|---|---|
| $-0.48 < \tan(EFL_4 * \log(\text{Slope}\_L_{42})) < -0.38;$ | conditional formula 1: |
| $1 \text{ mm} < \text{Infp}\_L_{41\_y} < 1.05 \text{ mm};$ | conditional formula 2: |
| $0.58 \text{ mm} < \text{Infp}\_L_{42\_y} < 0.69 \text{ mm};$ | condition 3: |
| $1 < (123\char`\^T_4)/(456\char`\^\text{Slope}\_L_{41}) < 1.67.$ | conditional formula 4: |

18 Claims, 6 Drawing Sheets

OPTICAL LENS AND ELECTRONIC DEVICE HAVING OPTICAL LENS

FIELD

The subject matter herein generally relates to optical lenses, and more particularly to an optical lens of an electronic device.

BACKGROUND

The total optical length of mobile phone lenses has been gradually reduced, but the size of the image sensor has not been reduced. Therefore, it may be desirable that the lens can focus images in a shorter space.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Figure 1:
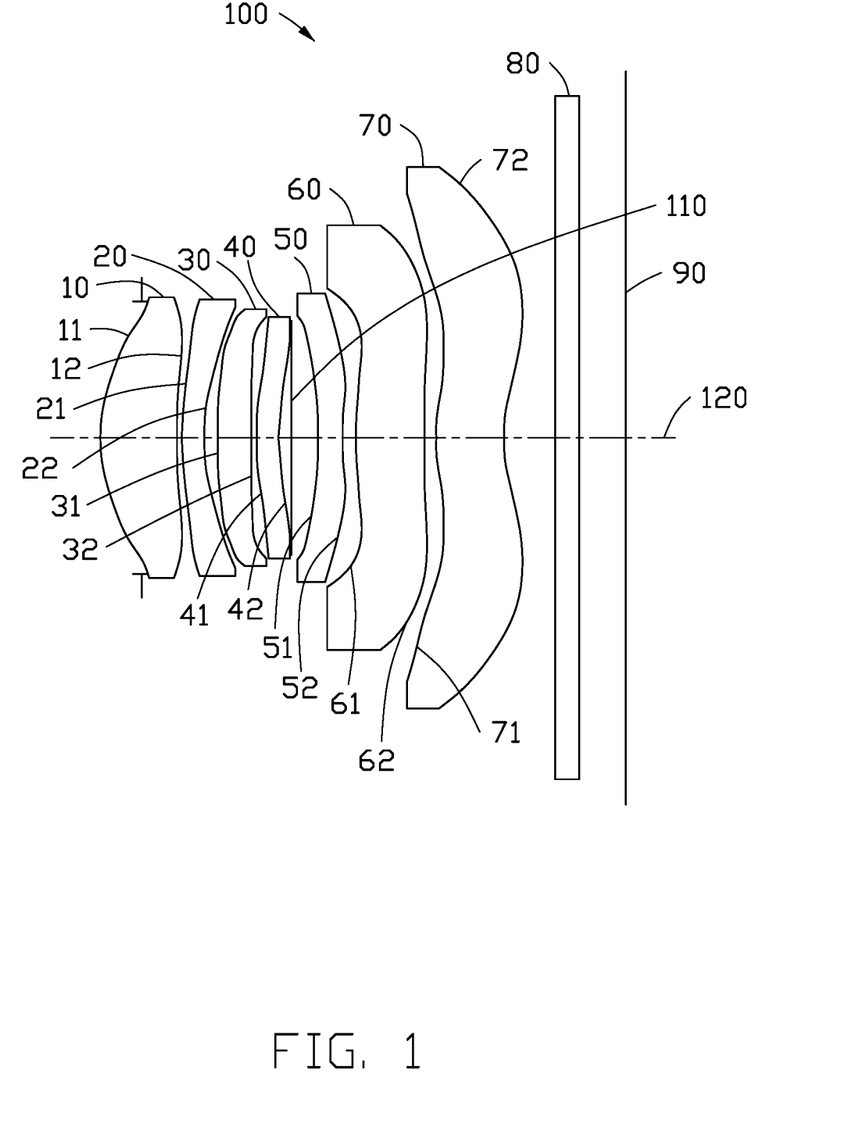
FIG. 1 is a schematic diagram of an optical lens according to an embodiment of the present disclosure.

FIG. 1 shows an embodiment of an optical lens 100. The optical lens 100 includes a first lens 10, a second lens 20, a third lens 30, a fourth lens 40, an aperture 110, a fifth lens 50, a sixth lens 60, a seventh lens 70, a filter 80, and an imaging plane 90.

The optical lens 100 has an optical axis 120. The first lens 10, the second lens 20, the third lens 30, the fourth lens 40, the aperture 110, the fifth lens 50, the seventh lens 70, the filter 80, and the imaging plane 90 are arranged symmetrically on the optical axis 120.

The first lens 10 is an aspheric lens and includes a first surface 11 and a second surface 12. The first surface 11 is opposite to the second surface 12 and protrudes toward the object side. The second surface 12 protrudes toward the image side.

The second lens 20 is an aspheric lens. The second lens 20 includes a third surface 21 and a fourth surface 22. The third surface 21 faces the second surface 12 and is opposite to the fourth surface 22. The third surface 21 protrudes toward the object side. The fourth surface 22 is recessed toward the object side.

The third lens 30 is an aspheric lens. The third lens 30 includes a fifth surface 31 and a sixth surface 32. The fifth surface 31 faces the fourth surface 22 and is opposite to the sixth surface 32. The fifth surface 31 is recessed toward the image side. The sixth surface 32 is recessed toward the object side.

The fourth lens 40 is an aspheric lens. The fourth lens 40 includes a seventh surface 41 and an eight surface 42. The seventh surface 41 faces the sixth surface 32 and is opposite to the eighth surface 42. The seventh surface 41 protrudes toward the object side, and the eighth surface 42 is recessed toward the object side. Both the seventh surface 41 and the eighth surface 42 are wave-shaped. Both the seventh surface 41 and the eighth surface 42 have at least one inflection point.

The aperture 110 is located between the fourth lens 40 and the fifth lens 50 on the optical axis 120. Specifically, the aperture 110 is located adjacent to the eighth surface 42 of the fourth lens 40.

The fifth lens 50 is an aspheric lens. The fifth lens 50 includes a ninth surface 51 and a tenth surface 52. The ninth surface 51 faces the eighth surface 42. The tenth surface 52 is opposite to the ninth surface 51. The ninth surface 51 is recessed toward the image side, and the tenth surface 52 is recessed toward the object side.

The sixth lens 60 is an aspheric lens. The sixth lens 60 includes an eleventh surface 61 and a twelfth surface 62. The eleventh surface 61 faces the tenth surface 52. The twelfth surface 62 is opposite to the eleventh surface 61. The eleventh surface 61 is recessed toward the image side, and the twelfth surface 62 protrudes toward the image side.

The seventh lens 70 is an aspheric lens. The seventh lens 70 includes a thirteenth surface 71 and a fourteenth surface 72. The thirteenth surface 71 faces the twelfth surface 62. The fourteenth surface 72 is opposite to the thirteenth surface 71. The thirteenth surface 71 is recessed toward the image side, and the fourteenth surface 72 protrudes toward the image side.

The filter 80 is used to filter out infrared light of light passing through the seventh lens 70.

The imaging plane 90 is used for imaging.

In one embodiment, the optical lens 100 satisfies the following conditional formulas:

| | |
|---|---|
| $-0.48 < \tan(\text{EFL}_4 * \log(\text{Slope}\_L_{42})) < -0.38$; | Conditional formula 1: |
| $1 \text{ mm} < \text{Infp}\_L_{41}\_y < 1.05 \text{ mm}$; | Conditional formula 2: |
| $0.58 \text{ mm} < \text{Infp}\_L_{42}\_y < 0.69 \text{ mm}$; | Conditional formula 3: |
| $1 < (123\char`\^T_4)/(456\char`\^\text{Slope}\_L_{41}) < 1.67$; | Conditional formula 4: |

T4=the thickness of the fourth lens 40; Slope_$L_{41}$=the surface slope of the seventh surface 41 of the fourth lens 40 at height y=0.654321 mm; $EFL_4$=the equivalent focal length of the fourth lens 40; Slope_$L_{42}$=the surface slope of the eighth surface 42 of the fourth lens 40 at height y=0.194875 mm; Infp_$L_{41\_y}$=the height of an inflection point on the seventh surface 41 of the fourth lens 40; Infp_$L_{42\_y}$=the height of an inflection point on the eighth surface 42 of the fourth lens 40.

Conditional formula 1 requires that the fourth lens 40 be able to condense incident light from a low angle. Conditional formulas 2 and 3 require that the seventh surface 41 and the eighth surface 42 of the fourth lens 40 both be wave-shaped. Conditional formula 4 restricts the thickness and surface slope of the fourth lens 40.

The optical lens 100 will be further elaborated as follows through different embodiments.

The following Tables 1-3 show some parameters of the optical lens 100 according to a first embodiment. In Table 1, R represents the radius of curvature of the corresponding surface, and T represents the thickness of the corresponding lens. Values in Tables 1-3 all satisfy the above conditional formulas 1-4.

TABLE 1

| Surface | Type | R(mm) | T(mm) |
|---|---|---|---|
| Object surface | Flat surface | Infinite | |
| Air | Flat surface | Infinite | |
| First surface | Aspherical surface | 1.67 | 0.72 |
| Second surface | Aspherical surface | −10.094 | 0.05 |
| Third surface | Aspherical surface | 4.728 | 0.22 |
| Fourth surface | Aspherical surface | 8.551 | 0.12 |
| Fifth surface | Aspherical surface | −19.12 | 0.32 |
| Sixth surface | Aspherical surface | 7.225 | 0.05 |
| Seventh surface | Aspherical surface | 3.931 | 0.22 |
| Eighth surface | Aspherical surface | 4.545 | 0.36 |
| Aperture | Flat surface | Infinite | |
| Ninth surface | Aspherical surface | −59.92 | 0.25 |
| Tenth surface | Aspherical surface | 6.846 | 0.13 |
| Eleventh surface | Aspherical surface | −0.699 | 0.64 |
| Twelfth surface | Aspherical surface | −2.403 | 0.12 |
| Thirteenth surface | Aspherical surface | −0.622 | 0.65 |
| Fourteenth surface | Aspherical surface | 1.13 | 0.49 |
| Filter | Flat surface | | 0.21 |
| Image surface | Flat surface | | 0.45 |

TABLE 2

| Aspherical surface coefficient | Seventh surface | Eighth surface |
|---|---|---|
| A2 | 0.0587 | 0.0256 |
| A4 | −0.0114 | 0.0222 |
| A6 | −0.0934 | −0.0886 |
| A8 | 0.021 | 0.0341 |
| A10 | 0.0292 | −0.0189 |
| A12 | −9.18E−03 | 9.22E−03 |
| A14 | 0 | 0 |
| A16 | 0 | 0 |

TABLE 3

| F/NO | FOV(2ω) | MTF (100 lp/m) Central field of view | MTF (100 lp/m) Corner field of view |
|---|---|---|---|
| 1.58 | 80° | >75 | >50 |

Figure 2:
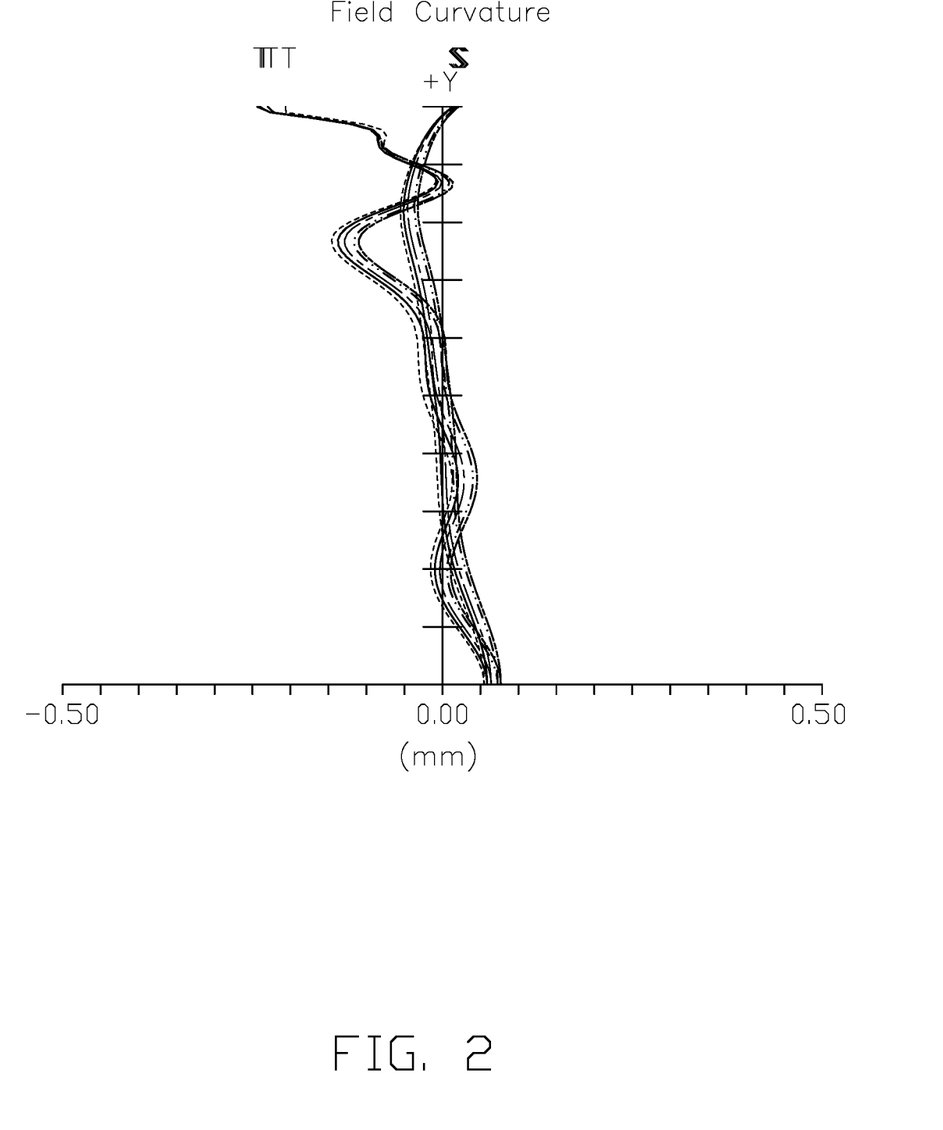
FIG. 2 is a characteristic curve diagram of imaging field curvatures of the optical lens for visible light according to a first embodiment of the optical lens.

FIG. 2 shows a characteristic curve diagram of imaging field curvatures of visible light for the first embodiment of the optical lens 100. The curves T and S are characteristic curves of a tangential field curvature and a sagittal field curvature, respectively. It can be seen from FIG. 2 that the tangential field curvature and the sagittal field curvature of the optical lens 100 in the first embodiment are controlled within a range of +0.1 mm to −0.3 mm.

Figure 3:
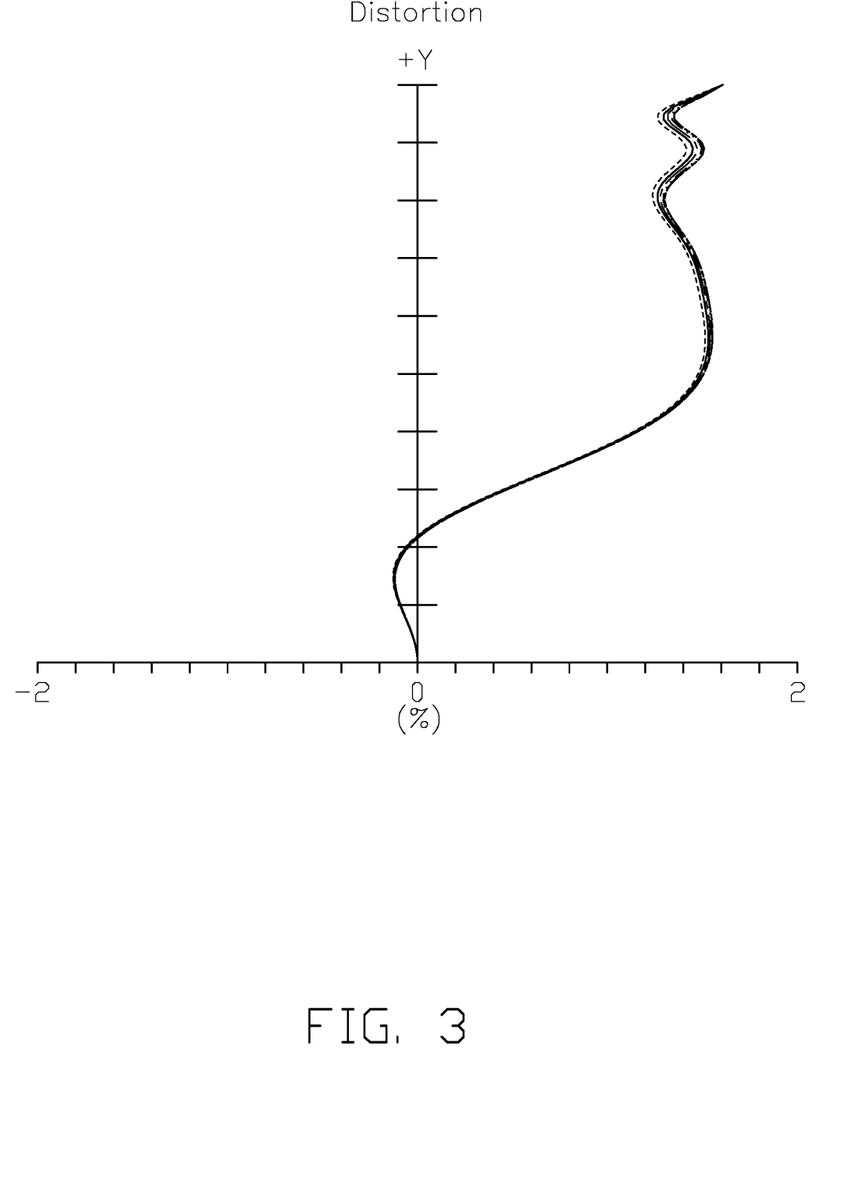
FIG. 3 is a distortion characteristic curvature of visible light for the first embodiment of the optical lens.

FIG. 3 shows a distortion characteristic curvature of visible light for the first embodiment of the optical lens 100. It can be seen that the amount of distortion of the optical lens 100 is controlled within a range of 0% to 2%.

The following tables 4-6 show some parameters of the optical lens 100 according to a second embodiment. In Table 4, R represents the radius of curvature of the corresponding surface, and T represents the thickness of the corresponding lens. Values of tables 4-6 all satisfy the above formulas 1-4.

TABLE 4

| Surface | Type | R(mm) | T(mm) |
|---|---|---|---|
| Object surface | Flat surface | Infinite | |
| Air | Flat surface | Infinite | |
| First surface | Aspherical surface | 1.692 | 0.71 |
| Second surface | Aspherical surface | −7.986 | 0.07 |
| Third surface | Aspherical surface | 5.218 | 0.22 |
| Fourth surface | Aspherical surface | 7.97 | 0.12 |
| Fifth surface | Aspherical surface | 54.97 | 0.32 |
| Sixth surface | Aspherical surface | 5.662 | 0.08 |
| Seventh surface | Aspherical surface | 5.216 | 0.25 |
| Eighth surface | Aspherical surface | 6.71 | 0.31 |
| Aperture | Flat surface | Infinite | — |
| Ninth surface | Aspherical surface | −53.084 | 0.27 |
| Tenth surface | Aspherical surface | 6.58 | 0.1 |
| Eleventh surface | Aspherical surface | −0.816 | 0.66 |
| Twelfth surface | Aspherical surface | −3.07 | 0.1 |
| Thirteenth surface | Aspherical surface | −0.974 | 0.66 |
| Fourteenth surface | Aspherical surface | 1.679 | 0.5 |
| Filter | Flat surface | | 0.21 |
| Image surface | Flat surface | | 0.4 |

TABLE 5

| Aspherical surface coefficient | Seventh surface | Eighth surface |
|---|---|---|
| A2 | 0.0464 | 0.0197 |
| A4 | −0.0183 | 0.0212 |
| A6 | −0.091 | −0.0581 |
| A8 | 9.67E−03 | −3.81E−03 |
| A10 | 0.022 | −4.48E−03 |
| A12 | −1.88E−03 | 3.48E−03 |
| A14 | 0 | 0 |
| A16 | 0 | 0 |

TABLE 6

| F/NO | FOV(2ω) | MTF (100 lp/m) Central field of view | MTF (100 lp/m) Corner field of view |
|---|---|---|---|
| 1.55 | 80° | >80 | >30 |

Figure 4:
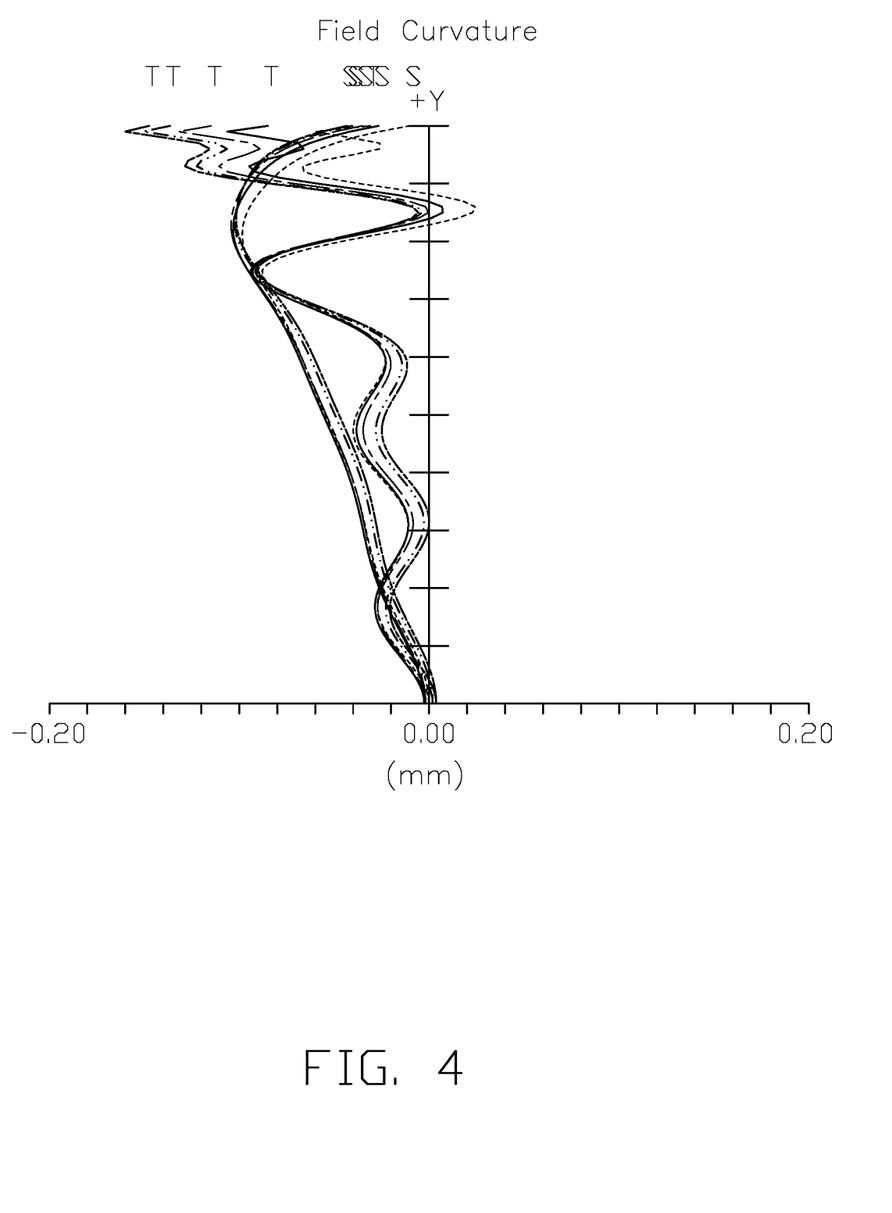
FIG. 4 is a characteristic curve diagram of imaging field curvatures of the optical lens for visible light according to a second embodiment of the optical lens.

FIG. 4 shows a characteristic curve diagram of imaging field curvatures of visible light for the second embodiment of the optical lens 100. The curves T and S are characteristic curves of a tangential field curvature and a sagittal field curvature, respectively. It can be seen from FIG. 4 that the tangential field curvature and the sagittal field curvature of the optical lens 100 in the first embodiment are controlled within a range of +0.04 mm to −0.2 mm.

Figure 5:
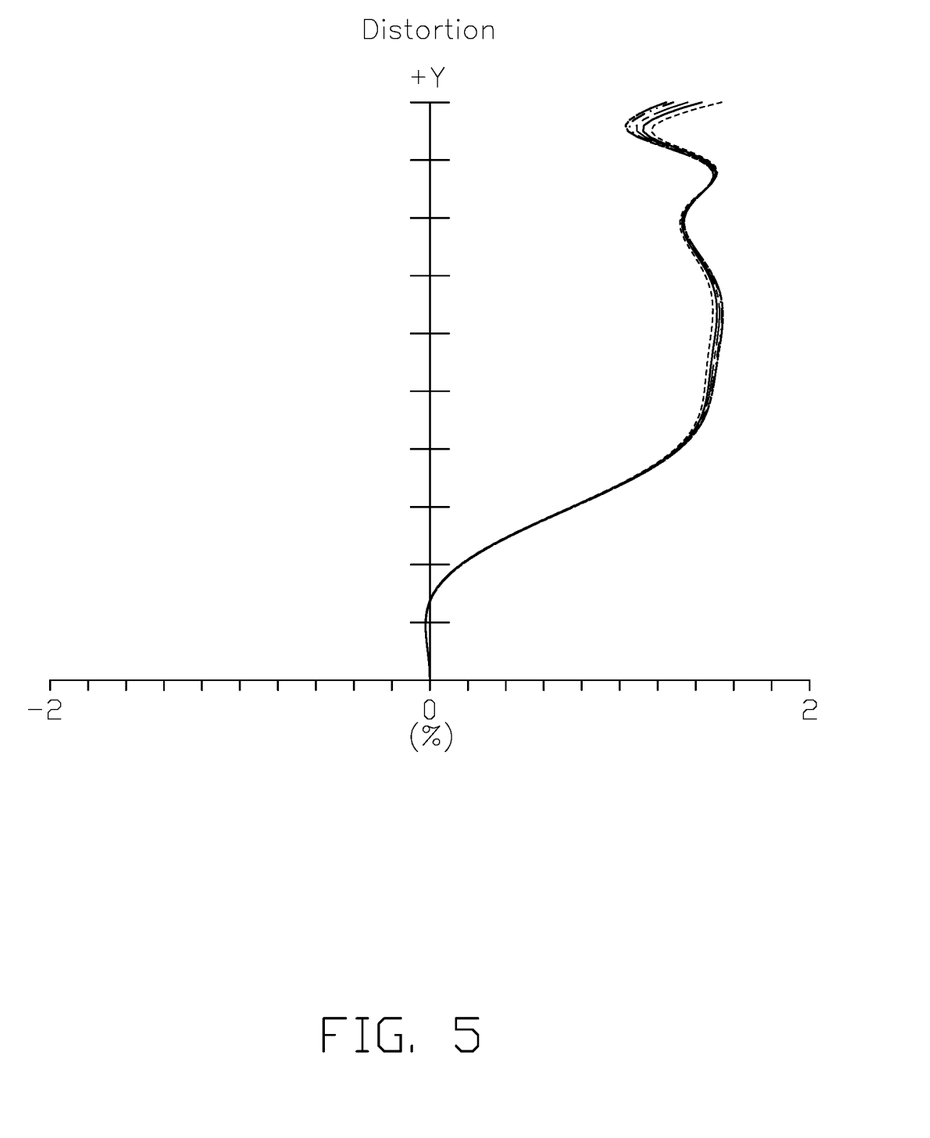
FIG. 5 is a distortion characteristic curvature of visible light for the second embodiment of the optical lens.

FIG. 5 shows a distortion characteristic curvature of visible light for the second embodiment of the optical lens 100. It can be seen that the amount of distortion of the optical lens 100 is controlled within a range of 0% to 1.6%.

Figure 6:
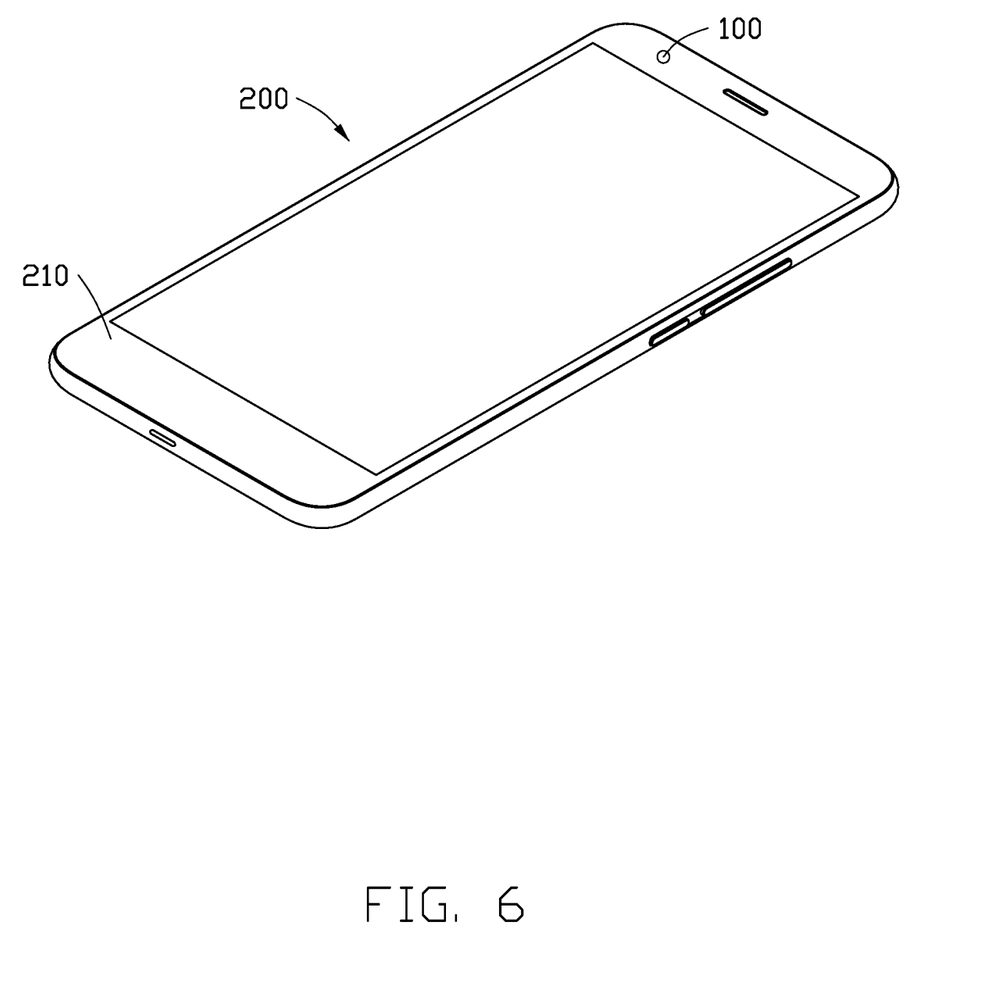
FIG. 6 is a schematic diagram of an electronic device including the optical lens.

Referring to FIG. 6, an electronic device 200 includes a main body 210. The electronic device 200 further includes at least one optical lens 100 as described above and arranged in the body 210.

The optical lens 100 and electronic device 200 provided by the present disclosure satisfy the above conditional formulas 1-4. The fourth lens 22 is a wave-shaped aspheric lens, so that the light incident into the optical lens 100 at a low angle can be quickly condensed and focused on the imaging plane 90 by subsequent lenses. Thus, image focusing can be realized in a shorter space, and an imaging quality of the optical lens 100 is improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical lens comprising an optical axis, the optical lens comprising a first lens, a second lens, a third lens, a fourth lens, a fifth lens, a sixth lens, and a seventh lens sequentially arranged along the optical axis from an object side to an image side, wherein:

the fourth lens comprises a seventh surface facing the object side and an eighth surface facing the image side;

each of the seventh surface and the eighth surface comprises at least one inflection point; and the optical lens satisfies the following conditional formulas:

$-0.48 < \tan(EFL_4 * \log(Slope\_L_{42})) < -0.38$;  Conditional formula 1:

$1\ mm < Infp\_L_{41\_y} < 1.05\ mm$;  Conditional formula 2:

$0.58\ mm < Infp\_L_{42\_y} < 0.69\ mm$;  Conditional formula 3:

$1 < (123^\wedge T_4)/(456^\wedge Slope\_L_{41}) < 1.67$;  Conditional formula 4:

T4=the thickness of the fourth lens;
Slope_$L_{41}$=the surface slope of the seventh surface of the fourth lens at height y=0.654321 mm;
EFL$_4$=the equivalent focal length of the fourth lens;
Slope_$L_{42}$=the surface slope of the eighth surface of the fourth lens at height y=0.194875 mm;
Infp_$L_{41\_y}$=the height of an inflection point on the seventh surface of the fourth lens;
Infp_$L_{42\_y}$=the height of an inflection point on the eighth surface of the fourth lens.

2. The optical lens of claim 1, wherein:
the first lens, the second lens, the third lens, the fourth lens, the fifth lens, the sixth lens, and the seventh lens are aspherical lenses.

3. The optical lens of claim 1, wherein:
the first lens comprises a first surface facing the object side and a second surface opposite to the first surface, the first surface protruding toward the object side, and the second surface protruding toward the image side;
the second lens comprises a third surface facing the second surface and a fourth surface opposite to the third surface, the third surface protruding toward the object side, and the fourth surface recessed toward the object side;
the third lens comprises a fifth surface facing the fourth surface and a fifth surface opposite to the sixth surface, the fifth surface recessed toward the image side, and the sixth surface recessed toward the object side;
the seventh surface faces the sixth surface, and the eighth surface is opposite to the seventh surface, the seventh surface protruding toward the object side, and the eighth surface recessed toward the object side;
the fifth lens comprises a ninth surface facing the eight surface and a tenth surface opposite to the ninth surface, the ninth surface recessed toward the image side, and the tenth surface recessed toward the object side;
the sixth lens comprises an eleventh surface facing the tenth surface and a twelfth surface opposite to the eleventh surface, the eleventh surface recessed toward the image side, and the twelfth surface protruding toward the image side;
the seventh lens comprises a thirteenth surface facing the twelfth surface and a fourteenth surface opposite to the thirteenth surface, the thirteenth surface recessed toward the image side, and the fourteenth surface recessed toward the object side.

4. The optical lens of claim 3, wherein:
the seventh surface and the eighth surface are both wave-shaped.

5. The optical lens of claim 1, wherein:
the first lens, the second lens, the third lens, the fourth lens, the fifth lens, the sixth lens, and the seventh lens are made of plastic.

6. The optical lens of claim 1, further comprising an aperture located between the fourth lens and the fifth lens, wherein:
the fourth lens, the aperture, and the fifth lens are spaced apart.

7. The optical lens of claim 1, wherein:
the optical lens has an aperture value of 1.58 and a central field of view of 80°.

8. The optical lens of claim 1, further comprising a filter located on a side of the seventh lens facing away from the sixth lens, wherein:
the seventh lens and the filter are spaced apart.

9. The optical lens of claim 8, further comprising an image plane located on a side of the filter facing away from the seventh lens, wherein:
the filter and the image plane are spaced apart.

10. An electronic device comprising a body and an optical lens arranged in the body, the optical lens comprising a first lens, a second lens, a third lens, a fourth lens, a fifth lens, a sixth lens, and a seventh lens sequentially arranged along the optical axis from an object side to an image side, wherein:

the fourth lens comprises a seventh surface facing the object side and an eighth surface facing the image side;

each of the seventh surface and the eighth surface comprises at least one inflection point; and the optical lens satisfies the following conditional formulas:

$-0.48 < \tan(EFL_4 * \log(Slope\_L_{42})) < -0.38$;  Conditional formula 1:

$1\ mm < Infp\_L_{41\_y} < 1.05\ mm$;  Conditional formula 2:

$0.58\ mm < Infp\_L_{42\_y} < 0.69\ mm$;  Conditional formula 3:

$1 < (123^\wedge T_4)/(456^\wedge Slope\_L_{41}) < 1.67$;  Conditional formula 4:

T4=the thickness of the fourth lens;
Slope_$L_{41}$=the surface slope of the seventh surface of the fourth lens at height y=0.654321 mm;
$EFL_4$=the equivalent focal length of the fourth lens;
Slope_$L_{42}$=the surface slope of the eighth surface of the fourth lens at height y=0.194875 mm;
Infp_$L_{41}$_y=the height of an inflection point on the seventh surface of the fourth lens;
Infp_$L_{42}$_y=the height of an inflection point on the eighth surface of the fourth lens.

11. The electronic device of claim 10, wherein:
the first lens, the second lens, the third lens, the fourth lens, the fifth lens, the sixth lens, and the seventh lens are aspherical lenses.

12. The electronic device of claim 10, wherein:
the first lens comprises a first surface facing the object side and a second surface opposite to the first surface, the first surface protruding toward the object side, and the second surface protruding toward the image side;
the second lens comprises a third surface facing the second surface and a fourth surface opposite to the third surface, the third surface protruding toward the object side, and the fourth surface recessed toward the object side;
the third lens comprises a fifth surface facing the fourth surface and a fifth surface opposite to the sixth surface, the fifth surface recessed toward the image side, and the sixth surface recessed toward the object side;
the seventh surface faces the sixth surface, and the eighth surface is opposite to the seventh surface, the seventh surface protruding toward the object side, and the eighth surface recessed toward the object side;
the fifth lens comprises a ninth surface facing the eight surface and a tenth surface opposite to the ninth surface, the ninth surface recessed toward the image side, and the tenth surface recessed toward the object side;
the sixth lens comprises an eleventh surface facing the tenth surface and a twelfth surface opposite to the eleventh surface, the eleventh surface recessed toward the image side, and the twelfth surface protruding toward the image side;
the seventh lens comprises a thirteenth surface facing the twelfth surface and a fourteenth surface opposite to the thirteenth surface, the thirteenth surface recessed toward the image side, and the fourteenth surface recessed toward the object side.

13. The electronic device of claim 12, wherein:
the seventh surface and the eighth surface are both wave-shaped.

14. The electronic device of claim 10, wherein:
the first lens, the second lens, the third lens, the fourth lens, the fifth lens, the sixth lens, and the seventh lens are made of plastic.

15. The electronic device of claim 10, further comprising an aperture located between the fourth lens and the fifth lens, wherein:
the fourth lens, the aperture, and the fifth lens are spaced apart.

16. The electronic device of claim 10, wherein:
the optical lens has an aperture value of 1.58 and a central field of view of 80°.

17. The electronic device of claim 10, further comprising a filter located on a side of the seventh lens facing away from the sixth lens, wherein:
the seventh lens and the filter are spaced apart.

18. The electronic device of claim 17, further comprising an image plane located on a side of the filter facing away from the seventh lens, wherein:
the filter and the image plane are spaced apart.

* * * * *